(12) United States Patent
Rothe et al.

(10) Patent No.: US 6,336,673 B1
(45) Date of Patent: Jan. 8, 2002

(54) CONVERTIBLE VEHICLE

(75) Inventors: Karl Rothe, Rieste; Olaf Weissmueller, Bramsche, both of (DE)

(73) Assignee: Wilhem Karmann GmbH, Osnabrueck (DE)

( * ) Notice: Subject to any disclaimer, the term of this patent is extended or adjusted under 35 U.S.C. 154(b) by 0 days.

(21) Appl. No.: 09/631,237

(22) Filed: Aug. 2, 2000

(30) Foreign Application Priority Data

Aug. 3, 1999 (DE) ..................... 299 13 486 U

(51) Int. Cl.⁷ .................................................. B60J 7/08
(52) U.S. Cl. .................................. 296/107.17; 296/108
(58) Field of Search ........................... 296/107.17, 108, 296/116, 117

(56) References Cited

U.S. PATENT DOCUMENTS

| | | | | |
|---|---|---|---|---|
| 2,812,975 A | * | 11/1957 | Warner | |
| 5,251,952 A | * | 10/1993 | Gucket et al. | 296/108 |
| 5,746,470 A | * | 5/1998 | Seel et al. | 296/108 |
| 5,769,483 A | * | 6/1998 | Danz et al. | 296/108 |
| 5,810,422 A | * | 9/1998 | Corder et al. | 296/108 |
| 5,979,970 A | * | 11/1999 | Rothe et al. | 296/107.17 |

* cited by examiner

Primary Examiner—Joseph D. Pape
(74) Attorney, Agent, or Firm—Jordan and Hamburg LLP

(57) ABSTRACT

A convertible vehicle with a roof includes at least two separate roof sections which can be deposited in the rear section of the vehicle, and for this purpose is supported at least by one main bearing allocated to the body, which is so designed that the roof includes at least two movable units which respectively are allocated to a body-side main bearing, in that the movable units are so interconnected that their opening or closing motion is effected by forced mechanical synchronization.

14 Claims, 5 Drawing Sheets

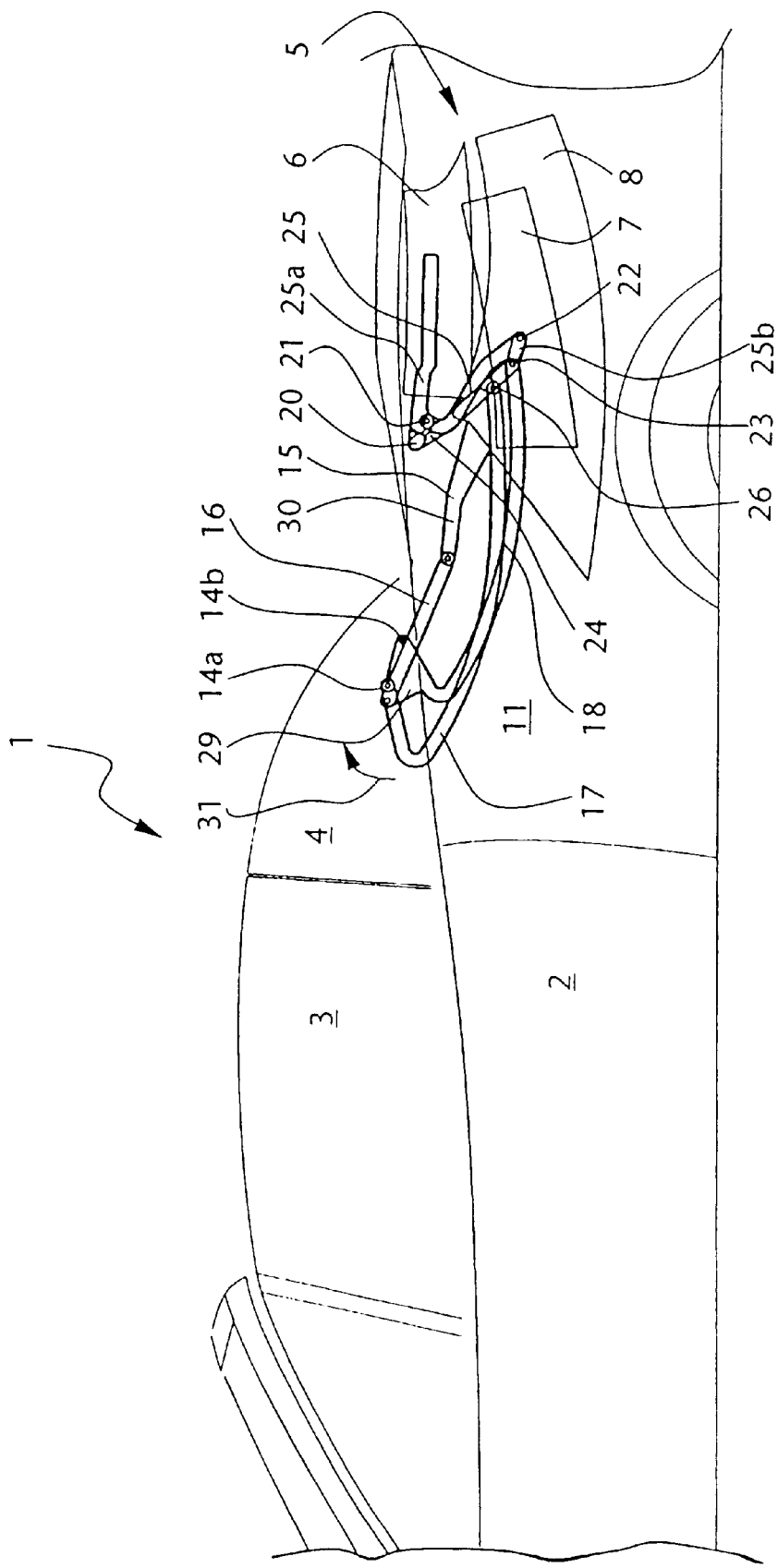

CONVERTIBLE VEHICLE

BACKGROUND OF THE INVENTION

This invention relates to a convertible vehicle with a roof which comprises at least two roof sections.

From U.S. patent specification 2,812,975 a convertible vehicle is known which has several fixed roof sections which are moved parallel against each other, in order to open said sections, and which can be inserted into the body in a stacked position. In this case, all roof sections are provided only at one main bearing distributed to both sides of the vehicle. Consequently, said bearing must bear the entire load of the roof sections, and the rod assembly sections must be dimensioned appropriately. This involves a high vehicle weight. In addition, only one driving element is provided at each vehicle side for the swiveling motion of the overall system, which accordingly must control the entire motion of the roof sections and, therefore, also must be dimensioned similarly with the above disadvantage. Also required are driving elements between the roof sections, in order to achieve the stacked depositing of said sections. This requires high expenditure for synchronization.

DE 196 42 152 A1 shows a convertible vehicle, in which a first movable unit of the roof comprises three roof sections and a second movable unit, and a second movable unit of the roof comprises a rear window, which can be deposited. The two movable units are structurally separate from each other, and each is provided with independent driving elements. In this the problem arises that the motions of the separate individual parts of the apparatus must be arranged in tandem, which extends the opening or closing time of the roof. Further, this design requires costly synchronization of the various drives, so as to enable the motion sequences to be effected independently, without interference.

SUMMARY OF THE INVENTION

It is the object of the present invention to provide a convertible vehicle, in particular, a convertible vehicle with a rear seat, which has several separate roof sections which can move against each other, in which is to be achieved an overall total lower weight and lower load of movable parts, in particular, the bearings.

The inventive division of the roof into several movable units is achieved in that the individual bearings and rod assembly sections, which are allocated to the individual movable units, must carry a smaller load. Therefore, these parts, if dimensioned smaller, can be designed with a lower weight. As a result of the mechanically forced coupling of the parts supporting the respective movable unit, nevertheless, only a single drive is required for all movable units, because the application of force upon a movable unit forcibly produces a displacement of one or other movable units. Therefore, one can dispense with the synchronization of several drives, or the development of several driving elements which are arrange in tandem on one side of the vehicle. Even with manual operation, in which the drive is effected by the user, these advantages remain, since they only exert force upon a movable unit and do not have to be concerned with the correct sequence of depositing or closing the roof section. This eliminates a wrong operation. Compared with individually controlling the roof sections, this reduces the time for opening or closing the roof.

When designing three roof sections arranged in tandem, a four- or five-seater convertible vehicle can also easily be provided with an inventive roof, which then may have the appropriate length to cover a large passenger space. If the two front sections of the roof then are combined into one movable unit and are maintained via a joint main bearing, the mechanical costs for this type of convertible vehicle can be kept low.

The linking of movable units can be achieved by simple means via mechanical coupling members, such as a coupling rod, which effect a forced coupling of the guide rod assembly components allocated to the varying movable units. These coupling members do not appreciably increase weight, because said members can be designed as simple steel profiles, aluminum profiles, or similar.

If the two front roof sections are interconnected by a four-link, which is particularly advantageous, said sections can be deposited parallel to each other, so that the space requirement for depositing is small. This requires no separate drive between the roof sections. The displacement of roof sections against each other, in particular, is advantageously supported by another four-link which interacts with the first link chain. The space requirement for the deposited roof is particularly small, if the front roof sections in the deposited position parallel to the rear roof section are maintained, while the vehicle is in horizontal position.

Other inventive advantages and features result from the embodiments of the object of the invention, as described in the following and shown in the accompanying drawings.

IN THE DRAWINGS

FIG. 4 shows a convertible vehicle according to FIG. 3 with the roof deposited at the rear.

DESCRIPTION OF THE PREFERRED EMBODIMENT

Figure 1:
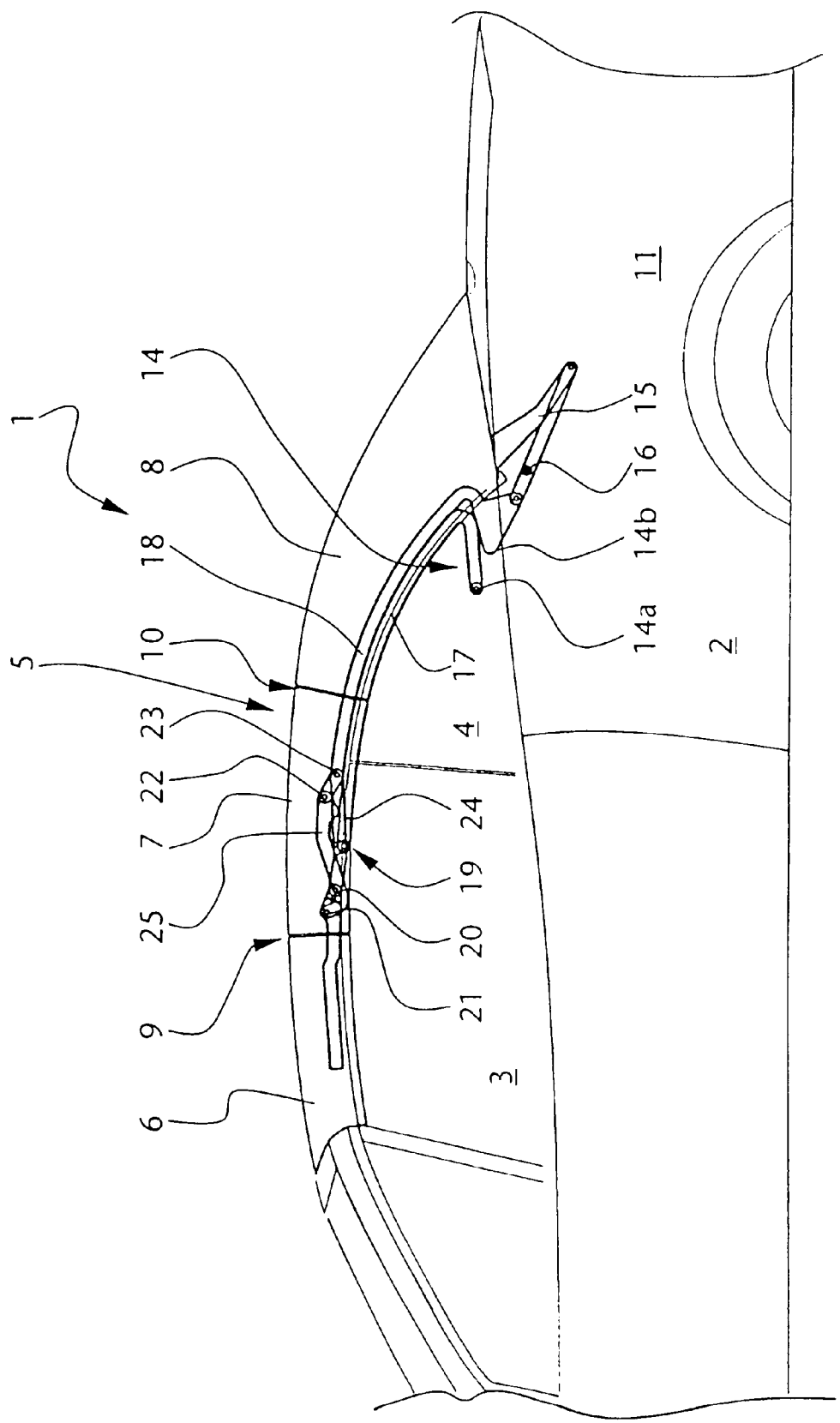
FIG. 1 shows a broken off schematic side view of an inventive convertible vehicle with closed roof.

The convertible vehicle 1 shown in the embodiment has a body 2 with a roof 5 covering said body in the area of a passenger interior for the front passengers 3 or rear passengers 4. In the embodiment, the roof 5 is designed overall in three parts and comprises the separate roof sections 6, 7 and 8. Depending on the vehicle's requirements, the roof 5 may also be subdivided into two or more than three roof sections.

The roof sections 6, 7 and 8 may overall be designed as rigid roof sections, for example, made of plastic or metallic material. It also is possible for said sections to cover a frame, or similar, with a textile cover. In each case, separate roof sections are developed which border on partition lines 9, 10.

The roof 5 can overall be deposited in the rear section 11 of the body 2, in which is located a box for depositing the cover.

The roof 5 is subdivided into two movable units 12, 13, in which the first movable unit 12 is allocated to a body-side front main bearing 14 and the second movable unit 13 is allocated to a body-side rear main bearing 15. Both main bearings 14, 15 are fixed to the body and are mechanically interconnected by means of a forced coupling 16 which is designed in the form of coupling rod.

The front movable unit 12 comprises the two front roof sections 6 and 7, and the rear movable unit 13 comprises the rear roof section 8. Another allocation of roof components and movable units is possible. Two guide rod assembly components 17, 18 are allocated to the front movable unit 12 and these components 17 and 18 connect the roof sections 6 and 7 with the front main bearing 14.

Further, the rod assembly component 17 starts out from a center of rotation 14a which is fixed to the body 2, and the rod assembly component 18 also starts from a center of rotation 14b on the body 2.

In the end section, which is averted from the main bearing 14, the guide rod assembly components 17 and 18 are connected with a first four-link 19. The four-link 19 is formed for the front and center roof section 6, 7 by means of rod assembly components 25a, 25, 25b and links 24, 32 which are held at the edge via link pivots 20, 23, and are interconnected via link pivots 21, 22. The rod assembly component 25a is designed as a single piece with the assembly component 25.

The guide rod assembly component 18, as an articulate lever for the center roof section 7, engages the link pivots 23 and 22, which are allocated to the center roof section 7. The link pivot 23 is interconnected via the lever 24 with the link 32 allocated to the front roof section 6. The front guide rod assembly component 17, as control rod, engages lever 25 at pivot 26 and lever 25 is connected to the pivot links 22 and 21.

When the roof 5 is closed (FIG. 1), the levers 24 and 25 of the four-ink 19 essentially are positioned parallel in front of each other, and the roof sections 6 and 7 are also positioned parallel to each other, as well as aligned.

Figure 2:
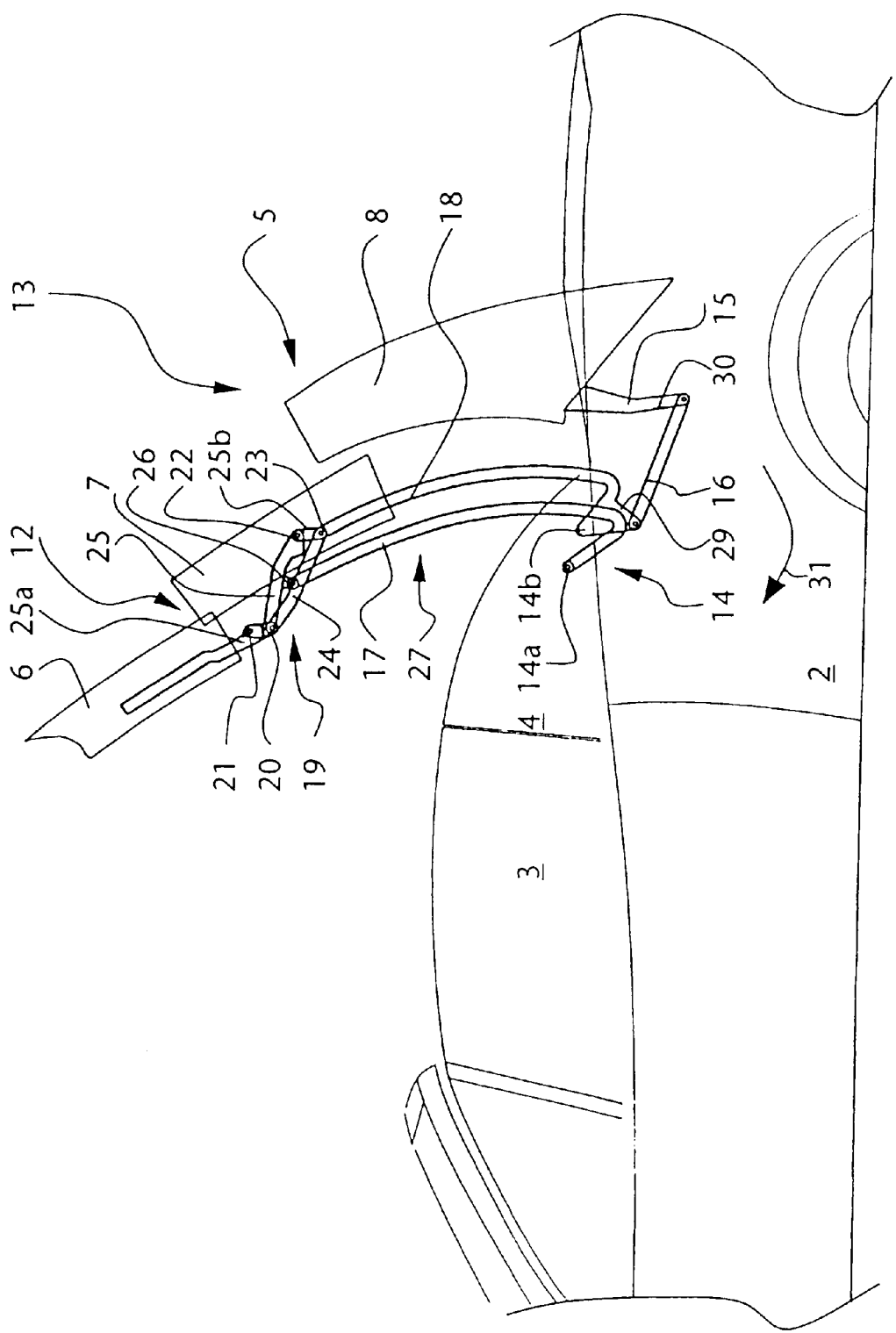
FIG. 2 shows a view similar to FIG. 1, while the roof is being opened.
Figure 2A:
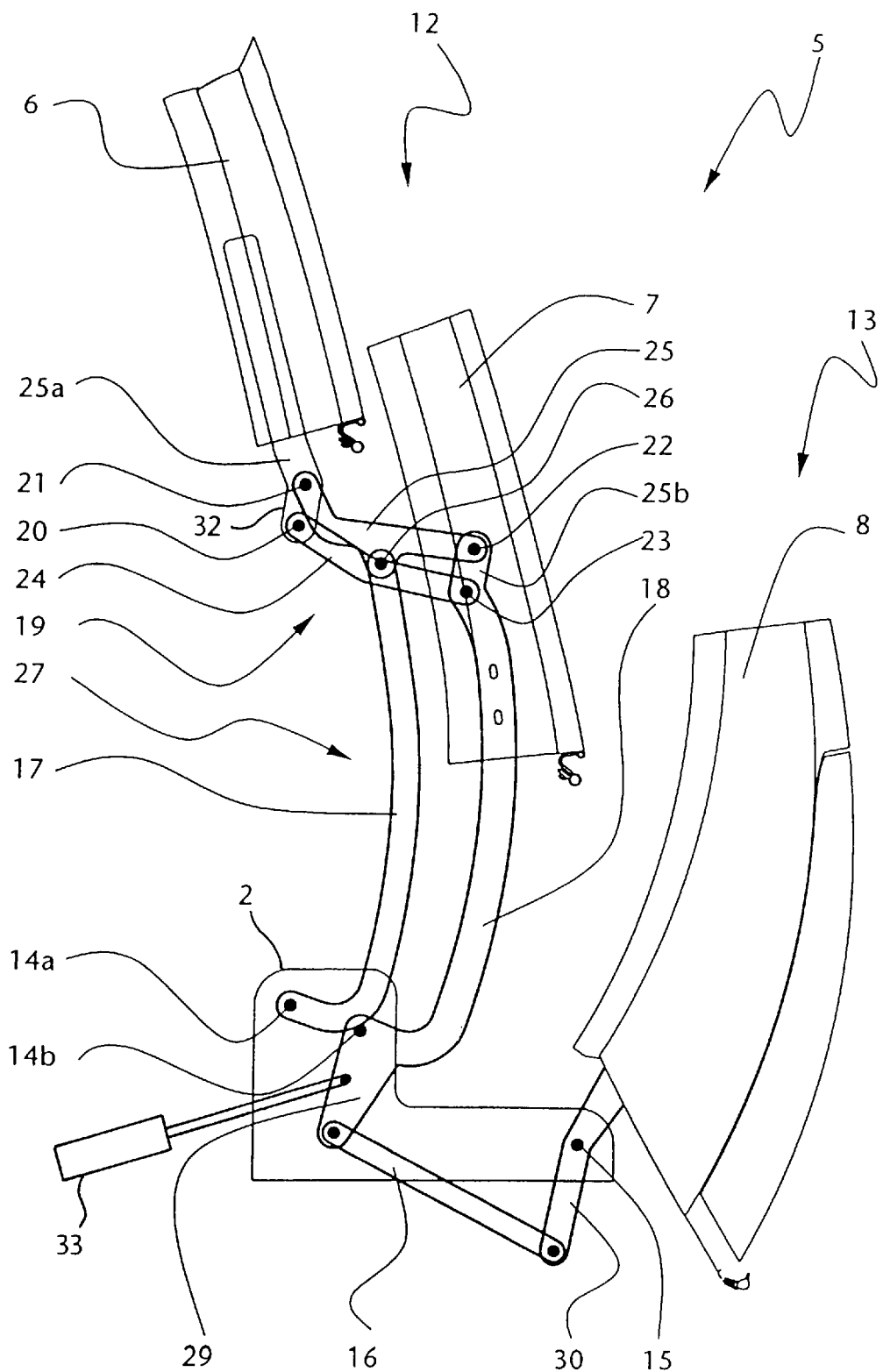
Figure 3:
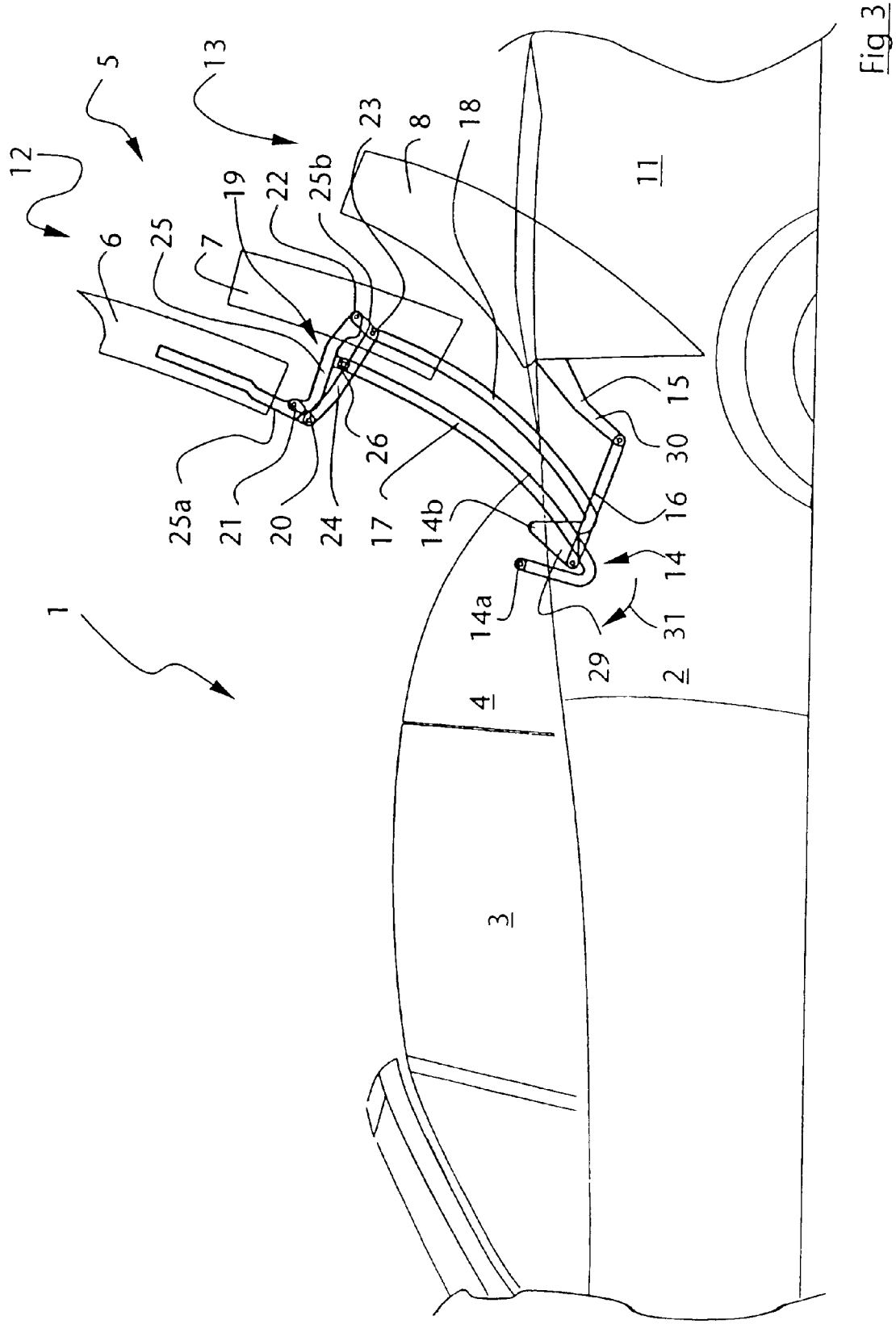
FIG. 3 shows a detailed view of the roof during the opening phase, according to FIG. 2.

While the roof is opening (FIG. 2, FIG. 3), the rear guide rod assembly component 18 applies a greater tensile force upon the link pivot 23 than the front guide rod assembly component 17 applies upon the lever 25. As result, the components 24 and 25 are displaced against each other, as well as the roof sections 6 and 7, which, as a result of the four-link 19 opening, are brought into a parallel position where said sections overlap and are positioned in front of each other.

Another four-link 27 is formed by the guide rod assembly components 17, 18, which are linked body-side at the bearings 14a 14b, and the rod assembly component 25, which is connected as previously described. The four-link 27 interacts as a link chain with the first four-link 19, such that the longitudinal levers 17, 18 initially move apart when opening the roof 5. This supports even further the one-in-front-of-the-other position of the roof sections 6 and 7, and as the roof is increasingly deposited, the roof sections 5, 6 are telescoped and deposited on top of each other, during which they are rolled over.

Overall, when the roof 5 (FIG. 4) is opened, a package of roof components 6, 7, 8 is formed, in which the roof sections 6 and 7 are accommodated in the upward pointing cambering of the rear roof section 8 which also is rolled over. The depositing kinematics are supported in that at one bracket 29 of the guide frame section 18, which rotates around the bearing 14b, a coupling member 16 is connected with a bracket 30 of the roof section 8 which rotates around the bearing 15. While the front roof section 6, 7 opens, the bracket 29 moves in the direction of the arrow 31 around the bearing 14b of the main bearing 14. As a result a tensile force is exercised upon the coupling member 16, which thus moves the bracket 30 of the rear roof section 8, which rotates around the bearing 15, towards the front and thus pivots section 8 into a horizontal position in the convertible vehicle top box. Vise versa, by applying force to the bracket 30 of the rear roof section 8, a thrust motion can be exercised upon the from roof sections 6, 7 via the coupling member 16, which is developed as a coupling rod. In any case, the force must only be applied to one of the brackets or roof sections, in order to activate the closing mechanism of the roof 5. Force can be applied both by hand and via a drive 33, e.g., a hydraulic cylinder. In this case, the coupling member 16 is a simple coupling rod. The rod can be mounted at the guide rod assembly component 17 instead of the guide rod assembly component 18. The coupling rod can apply pulling and pushing forces. Depending on the design of the drive, it suffices to provide a coupling member 16 only for applying tensile forces, for example, in the form of a flexible strap.

In terms of cover mechanism, the overall design of the convertible vehicle 1 is symmetrically to a longitudinal median plane, so that the described conditions exist on both sides of the body 2.

Both with automatic and manual activation, the above referred to advantages of a lower weight load, therefore, are achieved as the bearings and carrying rod assembly sections are relieved mechanically.

At the point of the two roof sections 6 and 7, which are allocated to the front movable unit 12, and the rear roof section 8 which is allocated to the rear movable unit 13, the conditions may also be reversed, or overall a the roof may be designed as a two-piece roof, in which only one roof section forms a movable unit. It is also possible that both the front and the rear movable unit consist of two roof sections, so that the roof is designed as a four-piece roof.

What we claim is:

1. A convertible vehicle, comprising:

a vehicle body;

a roof movable between a closed position and a down position;

said roof comprising first and second moveable roof units which can be deposited in a rear section of the vehicle when said roof is moved to said down position, a first linkage mounting said first moveable roof unit, a first main bearing pivotably mounting said first linkage on said vehicle body, a second linkage mounting said second moveable roof unit, a second main bearing pivotably mounting said second linkage on said vehicle body, said second linkage being free of any interconnection to said first moveable roof unit, and an interconnection connecting said first and second linkages such that movement of one of said first and second linkages between the closed and down positions effects a corresponding movement between said closed and down positions in a remaining one of said first and second linkages by forced mechanical synchronization transmitted through said interconnection.

2. A convertible vehicle according to claim 1, wherein said first movable roof unit has a configuration suitable for closure of a front portion of the vehicle, and said second movable roof unit has another suitable configuration for closure of a rear portion of the vehicle.

3. A convertible vehicle according to claim 1, wherein said first and second moveable roof units include three separate roof sections.

4. A convertible vehicle according to claim 2, wherein said first movable roof unit comprises front and center roof sections and said second movable unit comprises a rear roof section.

5. A convertible vehicle according to claim 1, wherein said interconnection comprises a coupling rod extending between and mechanically coupling said first and second movable roof units.

6. A convertible vehicle according to claim 1, further comprising a single drive for activating said first and second movable roof units.

7. The convertible vehicle according to claim 6, wherein the drive is hydrailic.

8. A convertible vehicle according to claim 4, further comprising a guide rod assembly connected to said front and center roof section, said guide rod assembly leading to the first main bearing.

9. A convertible vehicle according to claim 4, further comprising a four-link for the front and center roof section which, while opening the roof, effect a parallel displacement of the front and center roof sections against each other.

10. A convertible vehicle according to claim 9, further comprising linked guide rod components and an articulated assembly component connected therewith which form part of another four-link and defines a link with the first said four-link.

11. A convertible vehicle according to claim 4, wherein the rear roof section is held in a generally horizontal position while the roof is in the down position, an upwardly facing area of said rear roof section while in said down position facing downward while the roof is in said closed position.

12. A convertible vehicle, as defined in claim 4, wherein the front and center roof sections are maintained in a stacked position above the rear roof section when the roof is in said down position.

13. A convertible vehicle, comprising:

a vehicle body;

a roof movable between a closed position and a down position;

at least one main bearing mounted to the vehicle body for supporting the roof;

said roof including at least two movable units which can be deposited in a rear section of the vehicle when said roof is moved to said down position, said first movable unit comprising front and center roof sections and said second movable unit comprising a rear roof section, a guide rod assembly connected to said front and center roof sections, said at least one main bearing including a front main bearing and a rear main bearing, said guide rod assembly leading to the front main bearing, and an interconnection connecting said at least two movable units such that movement of one of said at least two movable units between said closed and down positions effects a corresponding movement between said closed and down positions in a remaining one of said at least two movable units by forced mechanical synchronization.

14. A convertible vehicle, comprising:

a vehicle body;

a roof movable between a closed position and a down position;

at least one main bearing mounted to the vehicle body for supporting the roof;

said roof including at least two movable units which can be deposited in a rear section of the vehicle when said roof is moved to said down position, said first movable unit comprising front and center roof sections and said second movable unit comprising a rear roof section, and said rear roof section being held in a generally horizontal position while the roof is in the down position, an upwardly facing area of said rear roof section while in said down position facing downward while the roof is in said closed position.

* * * * *